F. LOCORATOLO.
CANDY CUTTER.
APPLICATION FILED MAY 29, 1920.

1,370,027.

Patented Mar. 1, 1921.
2 SHEETS—SHEET 1.

INVENTOR
Frank Locoratolo
BY
ATTORNEY

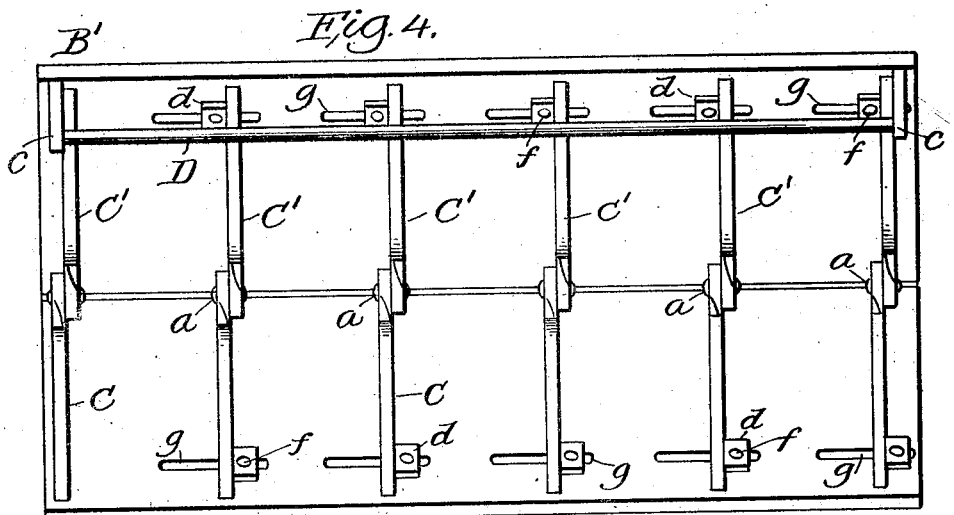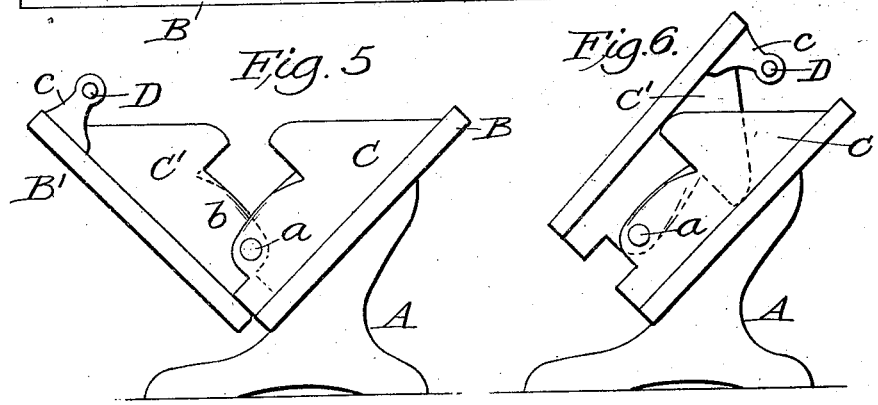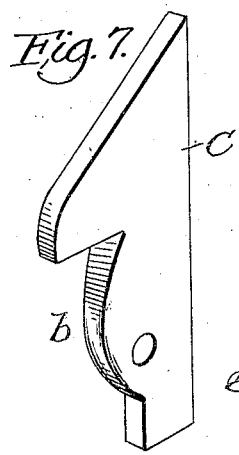

UNITED STATES PATENT OFFICE.

FRANK LOCORATOLO, OF BROOKLYN, NEW YORK.

CANDY-CUTTER.

1,370,027.  Specification of Letters Patent.  Patented Mar. 1, 1921.

Application filed May 29, 1920. Serial No. 385,168.

*To all whom it may concern:*

Be it known that I, FRANK LOCORATOLO, a citizen of the United States, residing in the borough of Brooklyn, city of New York, county of Kings, and State of New York, have made certain new and useful Improvements in Candy-Cutters, of which the following is a specification.

The invention relates to apparatus for readily cutting strings or strips of candy into short lengths and at the same time bunching or rounding the short lengths at each end.

The construction of parts and operation of the entire device will be more particularly described hereafter, reference being had to the accompanying drawings, in which—

Figure 1 is a perspective view of the cutter when open to receive a string of candy.

Fig. 2 indicates a string of candy before cutting.

Fig. 4 is a top view of the entire cutter.

Fig. 5 is an end view of Fig. 4 when opened.

Fig. 6 is an end view when closed and

Fig. 7 is a detached view of one of the cutters.

At each end of the machine are supports A, A, to which is secured one of the knife carrying boards B, in an inclined position, preferably at an angle of about forty-five degrees.

Additional supports A, may be used between those at the ends if desired.

Figure 1:
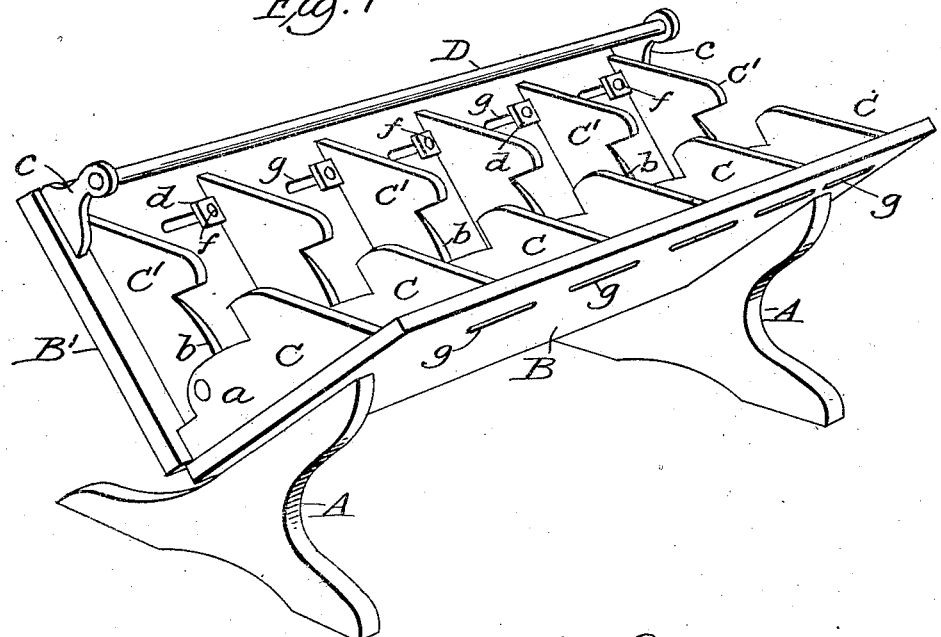
Figure 2:
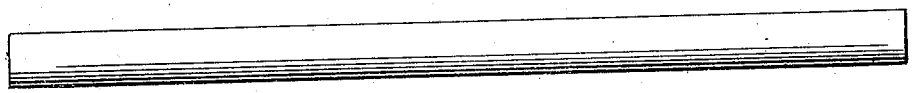
Figure 3:
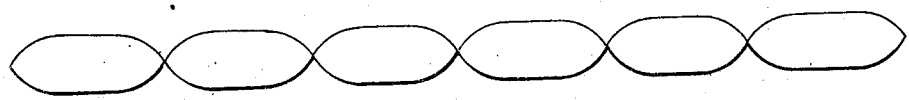
Fig. 3 shows the sections of candy after cutting.

Secured to the face of the knife board B, are bunching and cutting knives C, in a series of any desired number. Adjacent and opposite to the knife board B, is a similar board $B^1$, also carrying a series of bunching and cutting knives $C^1$, which are spaced to slide past the knives C, attached to the board B, in a shearing contact therewith. Each pair of blades or knives C, and $C^1$, are riveted together by rivets $a$, $a$, at a point a distance from their lower ends as shown in Figs. 1, 5 and 6 of the drawings.

The knives or cutters C and $C^1$, are also designed to push or crush the string of candy to a certain extent before cutting it. In order to do this, the edges of the blades at the part $b$, are made slightly rounded so they will not cut when first contacting with the string of candy, but bunch the string up before cutting it into sections.

The knife board $B^1$, is intended to swing over toward the board B in the operation of forming the short lengths of candy and a handle bar D, is secured to it by supports $c$, $c$, at each end. The apparatus is designed to have the supports A, A, rest on a table at a convenient height so the bar D, may be pulled forward by the hand of an operator.

When the board B, is pulled over to the position shown in Fig. 6, the bottom ends of the knife boards are separated, so the sections of candy can readily drop through onto the table and be conveniently removed.

In order to provide for cutting the string of candy into different lengths, the cutters are made adjustable to and from each other by means of ears or lugs $d$, $d$, at the base of the knives and a screw bolt $f$, passing through a slot $g$, in the knife board operated by a thumb screw.

The parts B and $B^1$ may be in one piece such as a board of suitable thickness, or composed of an open frame of suitable dimensions with slots $g$ and means for holding the knives C and $C^1$ in position. Such frames may be of metal if desired. I have shown the preferred construction but do not wish to limit myself specifically to the exact form shown in the drawings.

It will be observed that by providing a hinging or pivot point on which the cutting knives move on each other at a distance from their lower ends, these ends will separate when the upper part of the holding boards or frames are brought together, as will be seen in Fig. 6.

This produces a shearing movement and also provides a free way for the pieces of cut candy to drop past the bottom of the machine into a receptacle (not shown) which is placed below to receive them.

The distance of the pivot point $a$, which holds the knives together will be in accordance with the form of the knives. The lower ends of the knives act as a stop when coming in contact with the boards as shown in Figs. 1 and 5.

Having described my improvements what I claim as my invention and desire to cover by Letters Patent is:

1. The within described machine for cutting candy, comprising two companion cutter boards, each carrying a series of two or more knives oppositely positioned and secured thereon, each of said pair of knives pivoted together at a point some distance from their lower ends, together with a suitable support holding one of said cutter boards in an inclined position, substantially as shown and described.

2. In a candy cutting machine of the class described, two or more pairs of knives riveted together to form a pivoted point some distance from their lower ends, said knives being secured to inclined holding boards, adapted to swing on said pivoted point and means for adjusting the position of said pairs of knives on the boards, substantially as shown and described.

3. In a candy cutting machine of the class described, two companion cutter carrying boards with two or more pairs of knives secured thereto, pivoted to each other, said knives formed with a notch $b$, thereon above the pivoted point, substantially as and for the purpose shown and described.

FRANK LOCORATOLO.